UNITED STATES PATENT OFFICE.

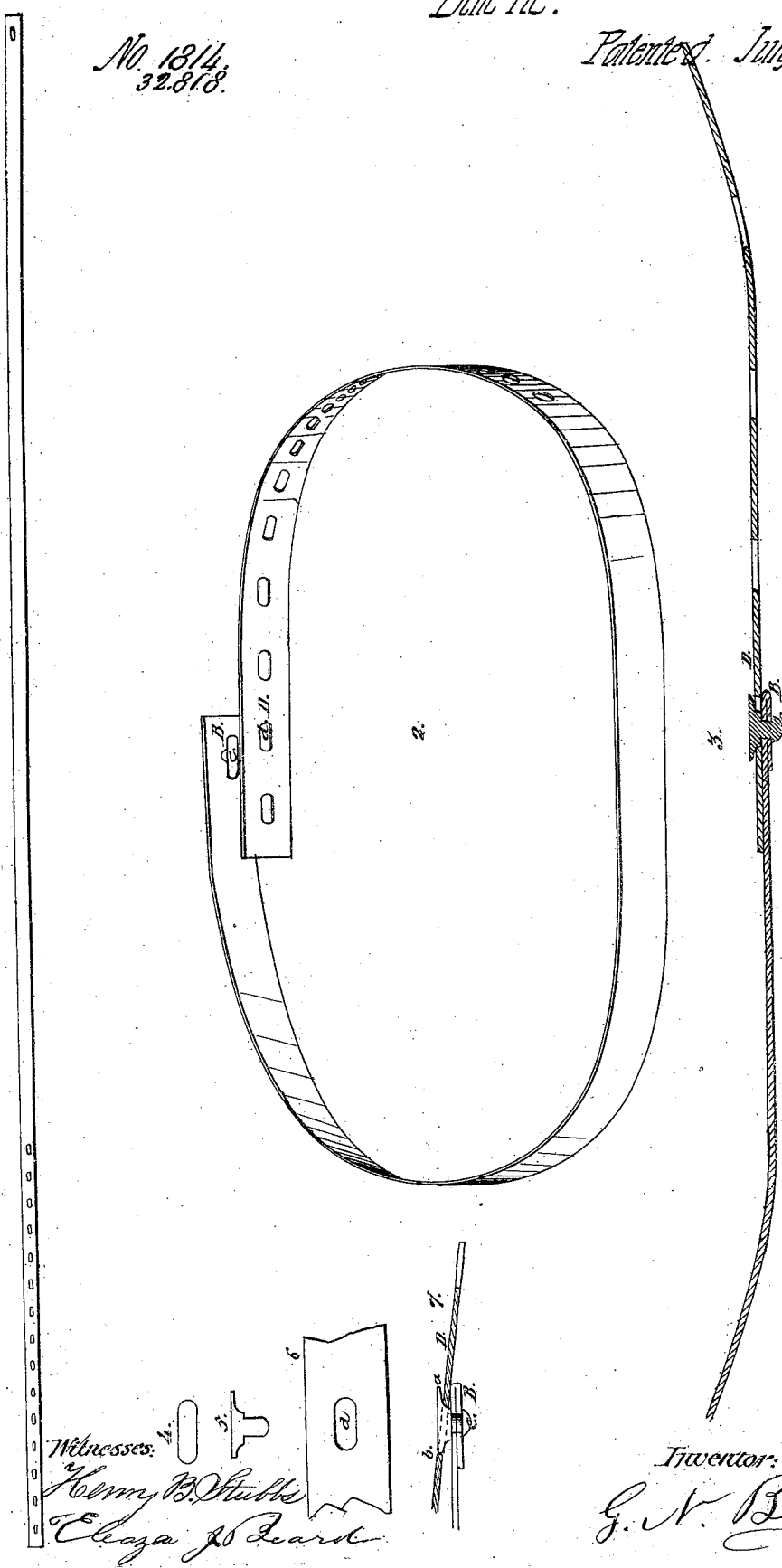

G. N. BEARD, OF ST. LOUIS, MISSOURI.

IMPROVEMENT IN IRON TIES FOR COTTON-BALES.

Specification forming part of Letters Patent No. 32,818, dated July 26, 1861.

*To all whom it may concern:*

Be it known that I, GEORGE N. BEARD, of St. Louis, in the county of St. Louis and State of Missouri, have invented a new and useful Improvement in Cotton-Bale Ties; and I do hereby declare that the following is a full, clear, and exact description of the same, reference being had to the annexed drawings, making part of this specification, in which—

Figure 1 is an outside view of a band or tie; Fig. 2, a perspective view of the same; Fig. 3, a longitudinal section. Figs. 4, 5, 6, and 7 are parts to be hereinafter referred to.

My invention relates to iron ties for cotton-bales. Its effect is to increase the efficiency of the lock, whereby the ends of the tie are joined; and it consists of a peculiar form and proportion of cleat with respect to the hole in which it is to hook.

The following description of my invention will enable any one skilled in the art to which it appertains to make and use the same.

Similar letters of reference represent corresponding parts of the different figures of the drawings annexed.

The part comprising the essential feature of this lock is the cleat, the hook whereof is made oblong, as shown in Fig. 4, which is a plan or top view of it, and the said cleat is made curved on its under side, as seen in Fig. 5, and one horn of the said cleat is made longer than the other—that is to say, the end $a$ is longer from the center which secures it in the end of the band B than the end $b$ is. Now, after the cleat $c$ has been riveted in the end of band, as shown, and the band has been passed around a pressed bale, the end B of the band is pressed down upon the bale, after which the end D is brought down and slightly bent in the loop-hole with the finger, so as to cause the long horn $a$ to enter the loop-hole. The band is then drawn up under the horn $a$ until the loop passes over the horn $b$. The end of the band is then pressed down by the finger, which completes the lock or tie. The advantage of this style of lock over that composed of a round or circular headed cleat or button is that this lock cannot be unlocked without bending back the end of the band when the bale is compressed on the edge, so as to throw the out end of the loop-hole clear of the horn $b$, whereas, in the case of the round or circular headed cleat, as soon as the bale is compressed on the edge, (which always happens in storing cotton in a ship's hold,) so as to bring the loop-hole flush with the head of the cleat, the band flies back and leaves the bale untied, the loop-hole slipping over the head of the cleat or button. This happens because the loop-hole is made as large or larger than the head of the cleat (as it must be when made round or circular) to enable the lock to be made. This difficulty, however, does not obtain in the case of my lock, for it will be seen that the cleat is much longer than the loop-hole, and that the horn $a$ is longer than the horn $b$, as it should be to make the tie more secure. The proper proportion to make this loop-hole with respect to the cleat is to make its length a little more than equal to the length of the horn $b$ plus the diameter of the rivet which secures the cleat to the end of the band, and the horn $a$ should be double the length of the horn $b$. I give these as the best proportions, but do not intend to limit my patent to them; nor do I intend to confine myself to applying the cleat to the outside of the band, where I have described it merely for the sake of convenience. It may be applied with equal if not more advantage to the inside of the band, as shown in the drawings at Fig. 2. When the cleat is applied in this way, the lock can be made without bending the end D of the band in the loop-hole.

It will appear from what I have above written that the superiority of this tie arises from the shape and proportion of the cleat with respect to the hole in which it locks.

What I claim, therefore, as my invention, and desire to secure by Letters Patent, is—

The shape and proportion of the cleat $c$ with respect to the loop-hole $d$, substantially as described, for the purpose specified.

G. N. BEARD.

Witnesses:
 FRANCIS ARMSTRONG,
 H. H. GOODWYN.